United States Patent [19]
Lin

[11] Patent Number: 6,085,614
[45] Date of Patent: Jul. 11, 2000

[54] PEDAL FOR A RACING BICYCLE

[76] Inventor: Wen-Hwa Lin, No. 812, Chang Shen Rd., Tian San Chun, Wei Pu Hsiang, Taichung Hsien, Taiwan

[21] Appl. No.: 09/292,391

[22] Filed: Apr. 15, 1999

[51] Int. Cl.[7] ........................................... G05G 1/14
[52] U.S. Cl. ........................ 74/594.6; 74/594.4; 36/131; D12/125
[58] Field of Search ................ 74/594.4–594.6; 36/131, 132; D12/125

[56] References Cited

U.S. PATENT DOCUMENTS

| D. 286,995 | 12/1986 | Pai ........................................ D12/125 |
| D. 387,706 | 12/1997 | Hanamura ............................. D12/125 |
| D. 414,723 | 10/1999 | Hanamura ............................. D12/125 |
| 5,203,229 | 4/1993 | Chen ...................................... 36/131 X |
| 5,692,415 | 12/1997 | Lin ......................................... 74/594.6 |
| 5,697,262 | 12/1997 | Chen ...................................... 74/594.6 |
| 5,771,757 | 6/1998 | Hanamura ............................. 74/594.4 |
| 5,784,931 | 7/1998 | Ueda ...................................... 74/594.4 X |
| 5,802,930 | 9/1998 | Chen ...................................... 74/594.6 |
| 5,852,956 | 12/1998 | Chen ...................................... 74/594.6 |

FOREIGN PATENT DOCUMENTS

0542238 A1   5/1993   European Pat. Off. ............... 36/131

*Primary Examiner*—Vinh T. Luong
*Attorney, Agent, or Firm*—Varndell & Varndell, PLLC

[57] ABSTRACT

A pedal for a racing bicycle in which a coupling structure is provided for enabling a pedal body to be coupled to a cage and turned about a shaft within a limited angle relative to the cage, wherein the coupling structure includes an end cap mounted in a stepped hole in the cage and engaged into locating grooves at the pedal body, the end cap having a locating block inserted into a sliding groove in the stepped hole inside the cage to limit the turning angle of the pedal body relative to the cage, a screw mounted in a countersunk hole at the end cap and threaded into a screw hole at the pedal body to fix the end cap to the pedal body, and a torsional spring mounted on the end cap and connected between a locating hole inside the pedal body and a notch in the stepped hole inside the cage for enabling the pedal body to be returned to its former position after each rotary notion.

2 Claims, 12 Drawing Sheets

PEDAL FOR A RACING BICYCLE

BACKGROUND AND SUMMARY OF THE INVENTION

The present invention relates to bicycle pedals, and more specifically to a pedal for a racing bicycle which enables the rider's shoe to be quickly fastened to the pedal body.

Figure 1:
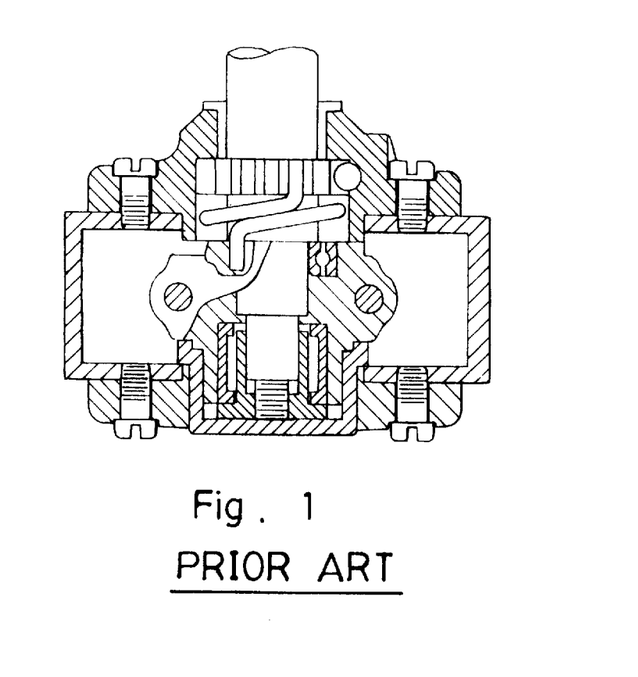
FIG. 1 is a top view in section of a part of a bicycle pedal according to the prior art.
Figure 2:
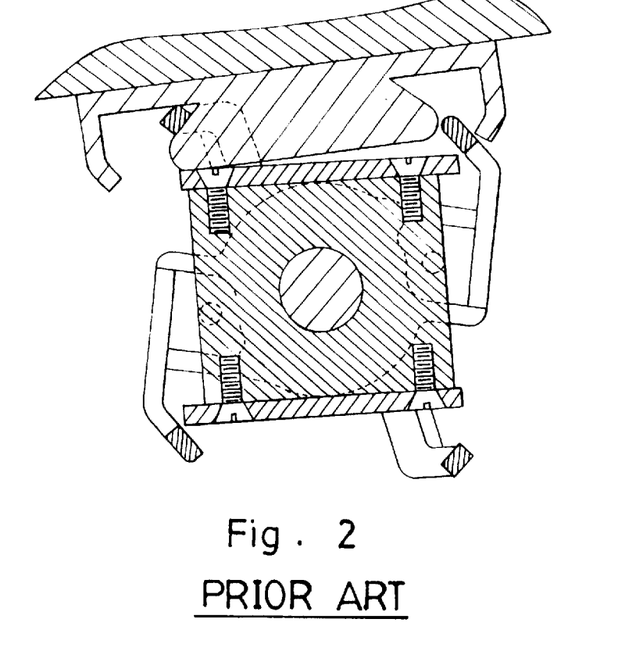
FIG. 2 is an end view in section in an enlarged scale of the bicycle pedal shown in FIG. 1 when operated.
Figure 3:
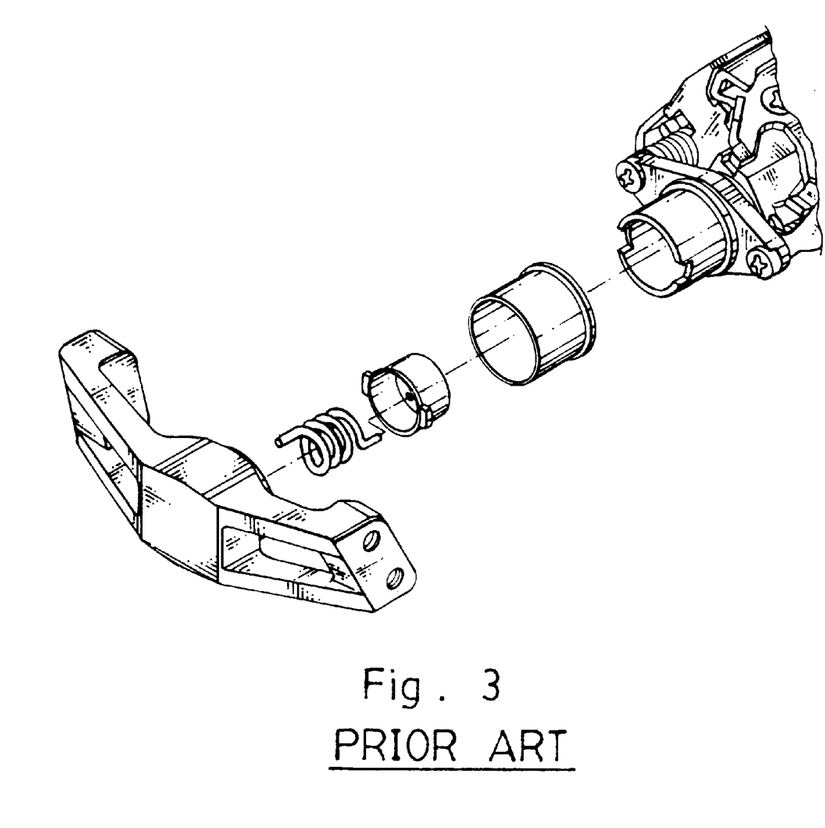
FIG. 3 is an exploded view of a part of another structure of bicycle pedal according to the prior art.
Figure 4:
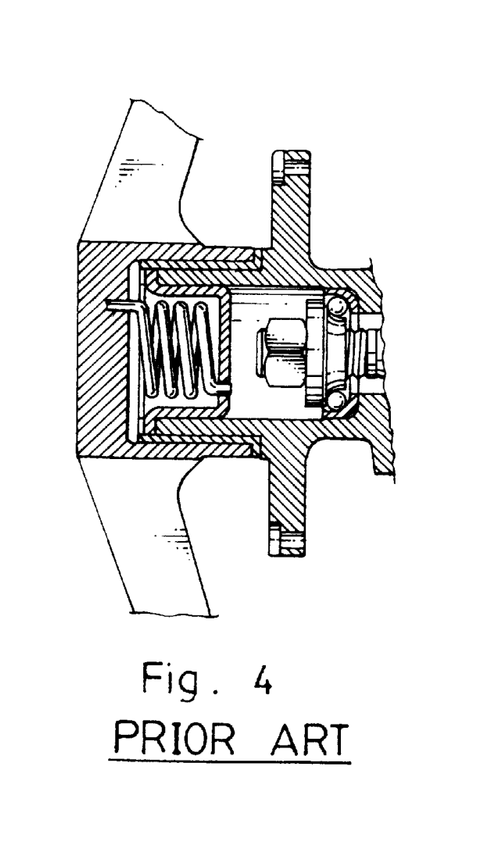
FIG. 4 is a sectional assembly view of the bicycle pedal shown in FIG. 3.
Figure 5:
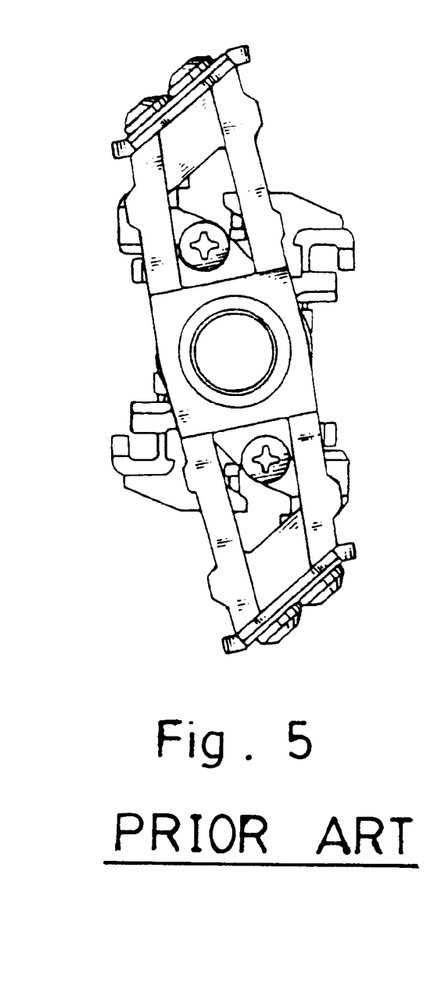
FIG. 5 is an operational view of the bicycle pedal shown in FIG. 3.
Figure 6:
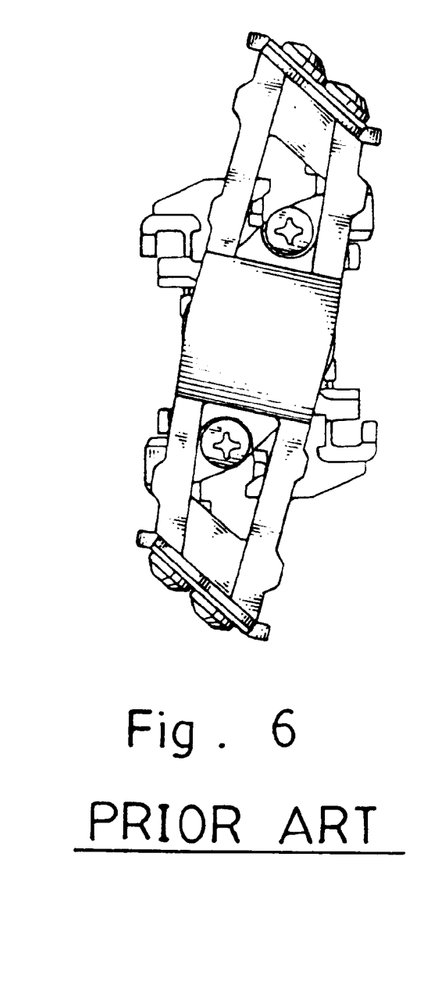
FIG. 6 is another operational view of the bicycle pedal shown in FIG. 3.
Figure 7:
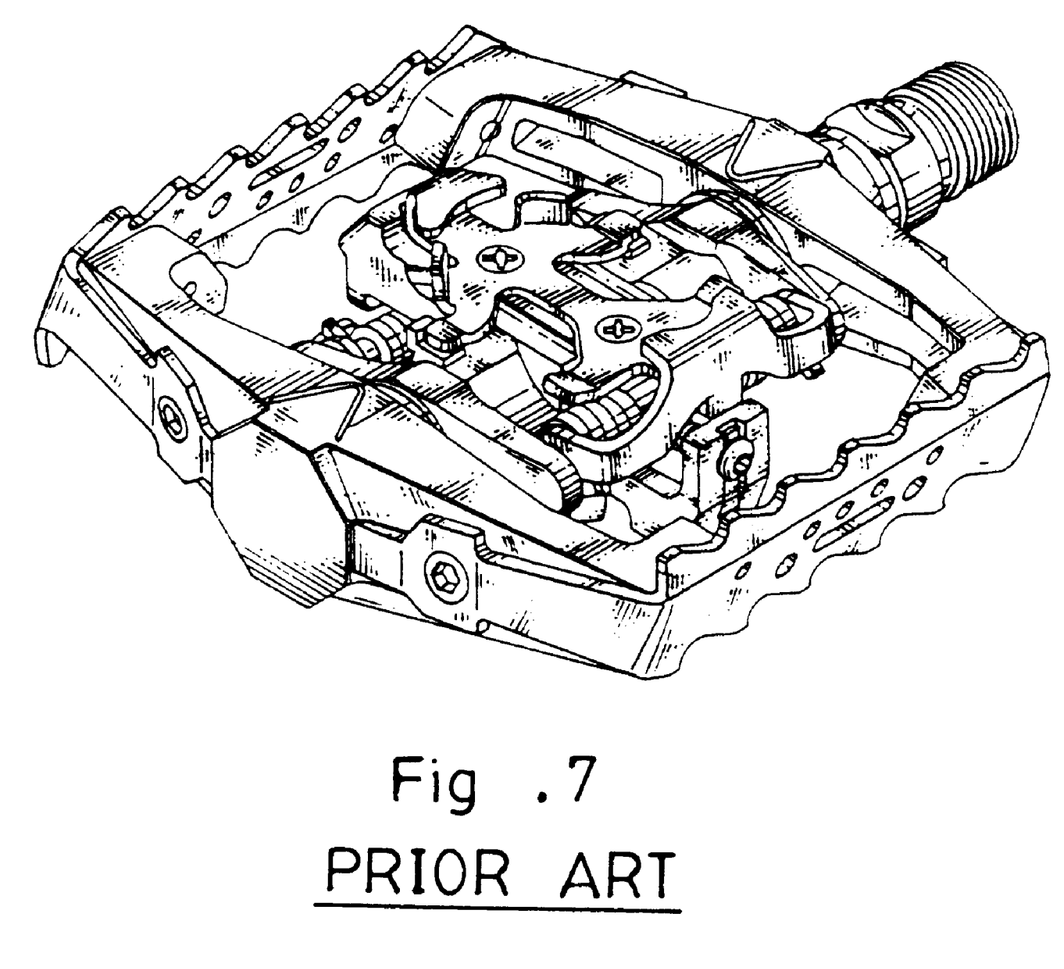
FIG. 7 is a perspective view of still another structure of bicycle pedal according to the prior art.
Figure 8:
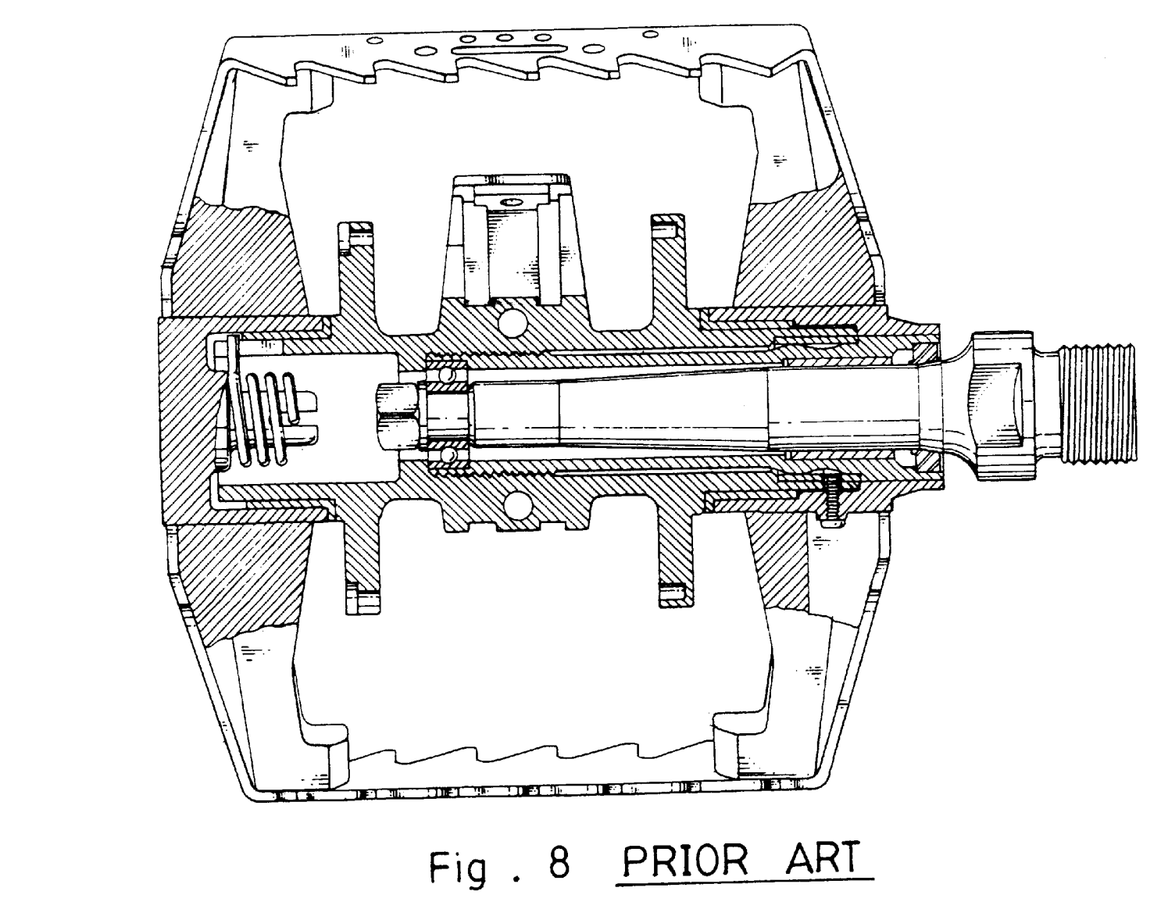
FIG. 8 is a top view in section in an enlarged scale of the bicycle pedal shown in FIG. 7.
Figure 9:
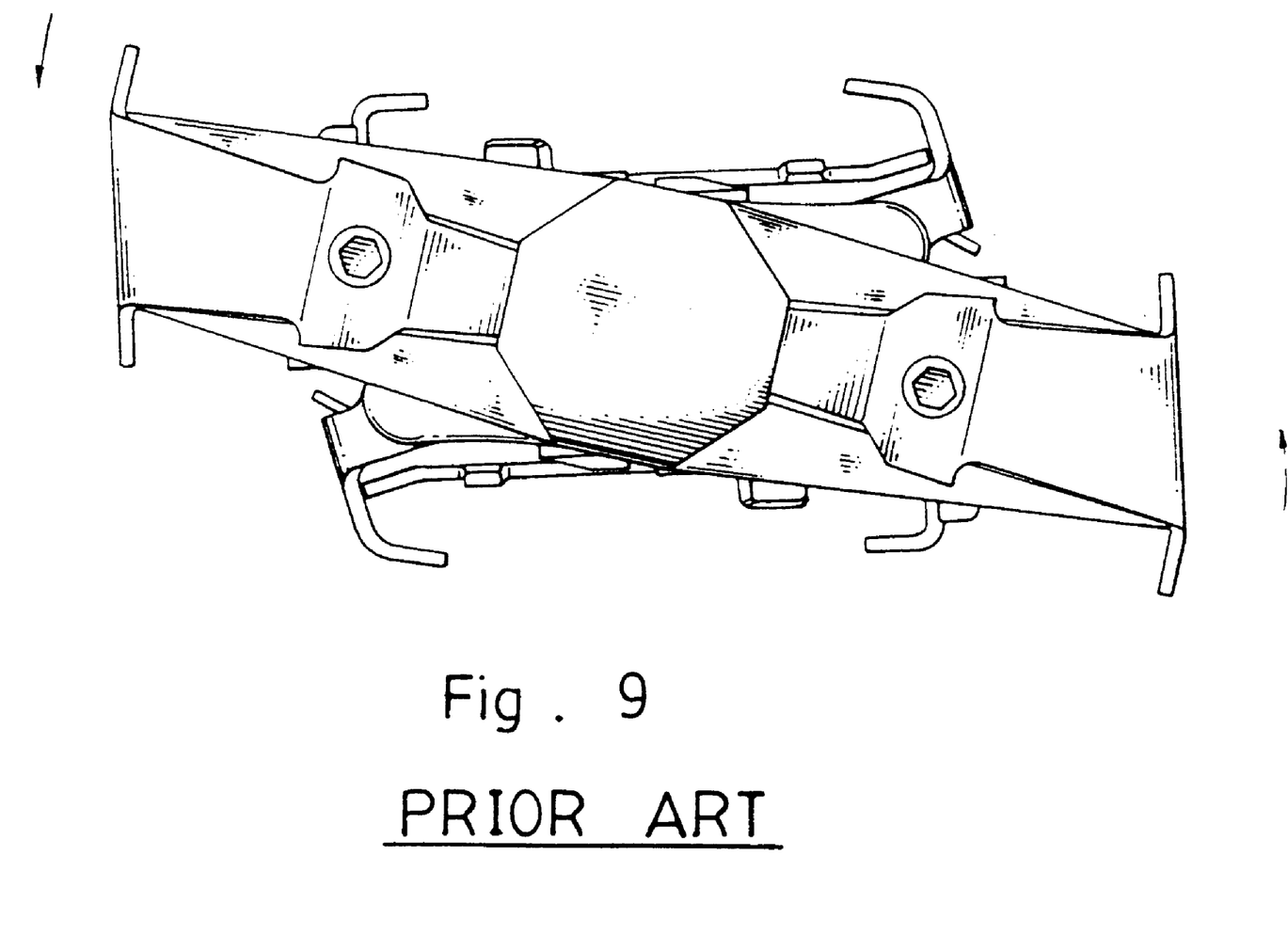
FIG. 9 is an operational view of the bicycle pedal shown in FIG. 7.
Figure 10:
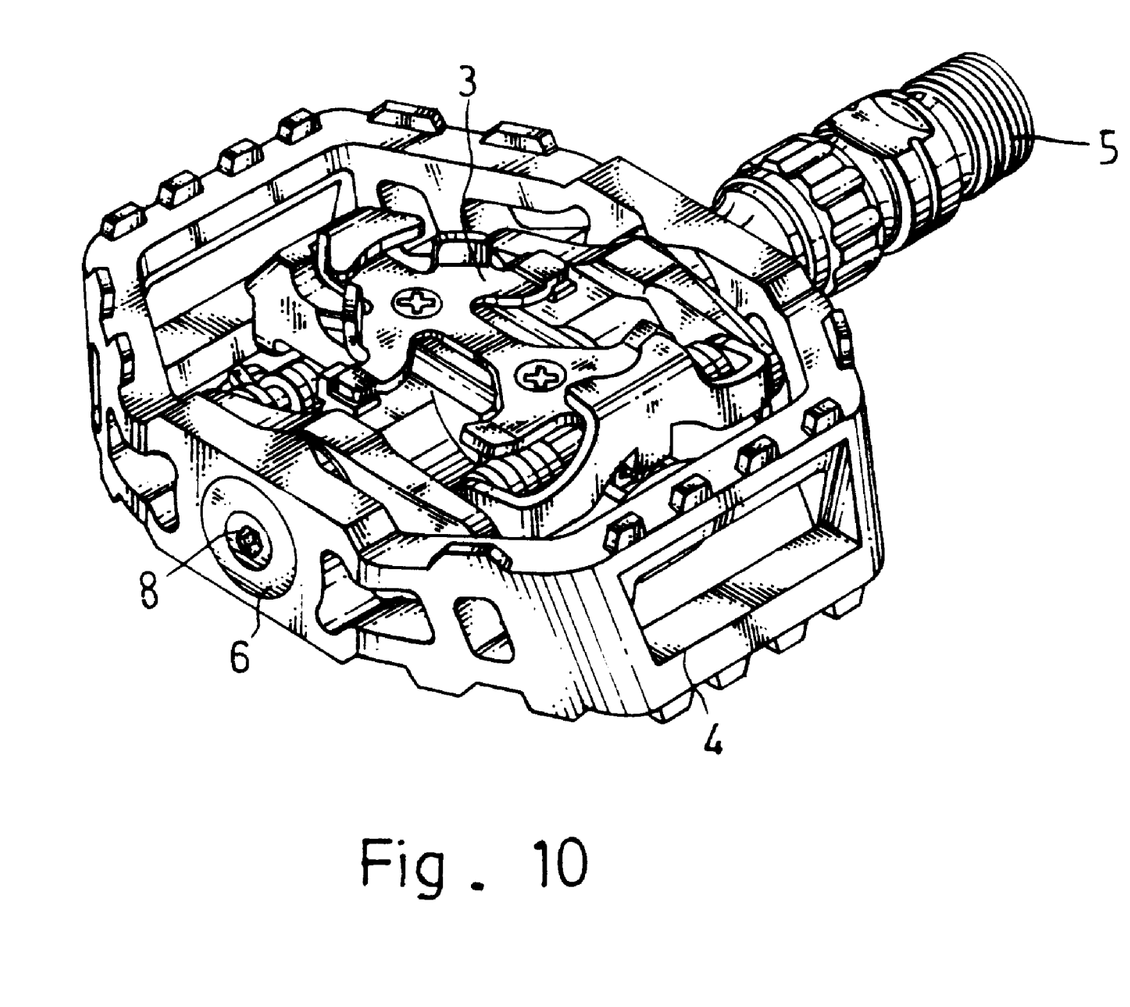
FIG. 10 is a perspective view of a bicycle pedal according to the present invention.

In regular racing bicycles, the pedal body can be turned about the shaft within a limited angle so that the shoe can be firmly secured to the pedal body when pedaling. FIG. 1 shows a pedal for a racing bicycle developed by "MARUI" Japan. This structure of bicycle pedal is comprised of "coupling plate connecting unit", "coupling plate retaining unit", and "biasing unit". The retaining unit is comprised an inner mounting block, an outer mounting block, a center mounting block, a spiral compression spring, a spring bushing, a spring adjustment screw, an inner sleeve, and a center bearing. The spiral compression spring has two opposite ends respectively fastened to the spring bushing and the center mounting block for enabling the connecting unit to be oscillated relative to the retaining unit (see FIG. 2). FIGS. 3 and 4 show another structure of bicycle pedal developed by "SHIMANO" Japan. According to this design, the structure which is disposed at the end of the pedal body and comprised a spring, a connecting block, an axle sleeve and a tube allows the pedal body to be oscillated within a limited angle (see FIGS. 5 and 6). During assembly process, the two opposite ends of the spring are respectively fastened to an inner hole at the connecting block and a blind hole at a wing plate and then inserted into the tube, and then a notch at the tube is forced into engagement with a retaining lug at the connecting block. Because the inner hole at the connecting block and the blind hole at the wing plate are not axially aligned, the spring must be twisted so that the two opposite ends of the spring can be respectively fastened to the inner hole at the connecting block and the blind hole at the wing plate. This installation procedure is complicated. FIGS. from 7 through 9 show still another structure of prior art bicycle pedal in which a pedal body is fastened to a shaft, a cage is mounted on the shaft around the pedal body, a torsional spring is mounted on a rod raised from a wing plate of the cage with its two opposite ends respectively fastened to a notch at the rod and a groove in the pedal body. This structure of bicycle pedal still has drawbacks. Because the cage is comprised of two symmetrical wing plates, the torsional spring, related axle bush and the pedal body must be coupled to the outer wing plate before installation of the inner wing plate. When installing the inner wing plate, it is difficult to keep the torsional spring in position. Further, when replacing, adjusting or repairing one component part in the cage, the whole assembly of the bicycle pedal must be dismounted.

The present invention provide a bicycle pedal which can easily be assembled or disassembled. According to the preferred embodiment of the present invention, the pedal is comprised of a shaft, a cage secured to the shaft, a pedal body mounted on the shaft within the cage and turned about the shaft relative to the cage, and a coupling structure which enables the pedal body to be coupled to the cage and turned about the shaft within a limited angle relative to the cage. The coupling structure comprises an end cap mounted in a stepped hole in the cage and engaged into locating grooves at the pedal body, the end cap having a locating block inserted into a sliding groove in the stepped hole inside the cage to limit the turning angle of the pedal body relative to the cage, a screw mounted in a countersunk hole at the end cap and threaded into a screw hole at the pedal body to fix the end cap to the pedal body, and a torsional spring mounted on the end cap and connected between a locating hole inside the pedal body and a notch in the stepped hole inside the cage for enabling the pedal body to be returned to its former position after each rotary motion.

DETAILED DESCRIPTION OF THE PREFERRED EMBODIMENT

Referring to Figures from 10 through 15, a bicycle pedal is shown comprised of a pedal body 3, a cage 4, a shaft 5, an end cap 6, and a torsional spring 7.

Figure 11:
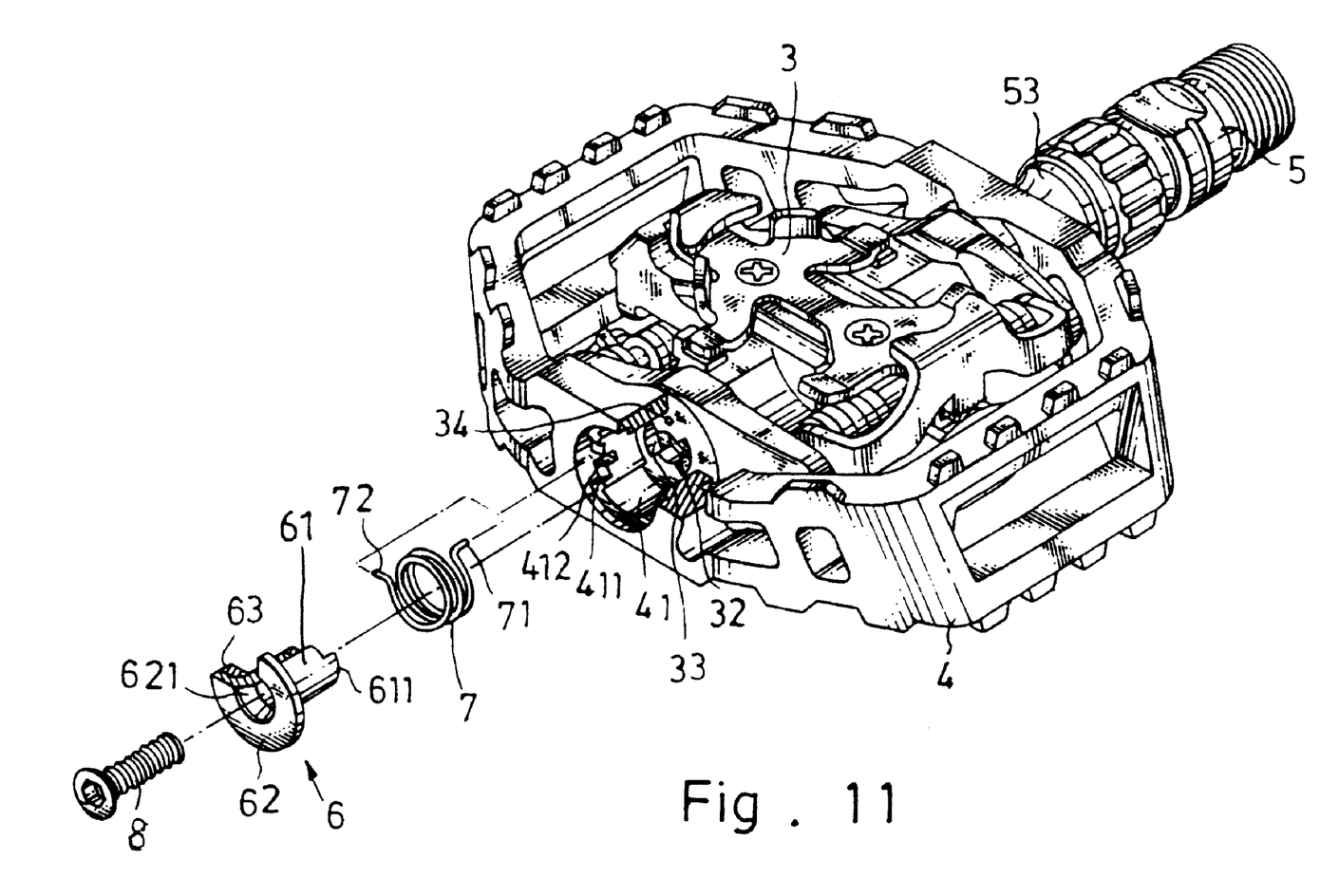
FIG. 11 is an exploded view of the pedal shown in FIG. 10.
Figure 12:
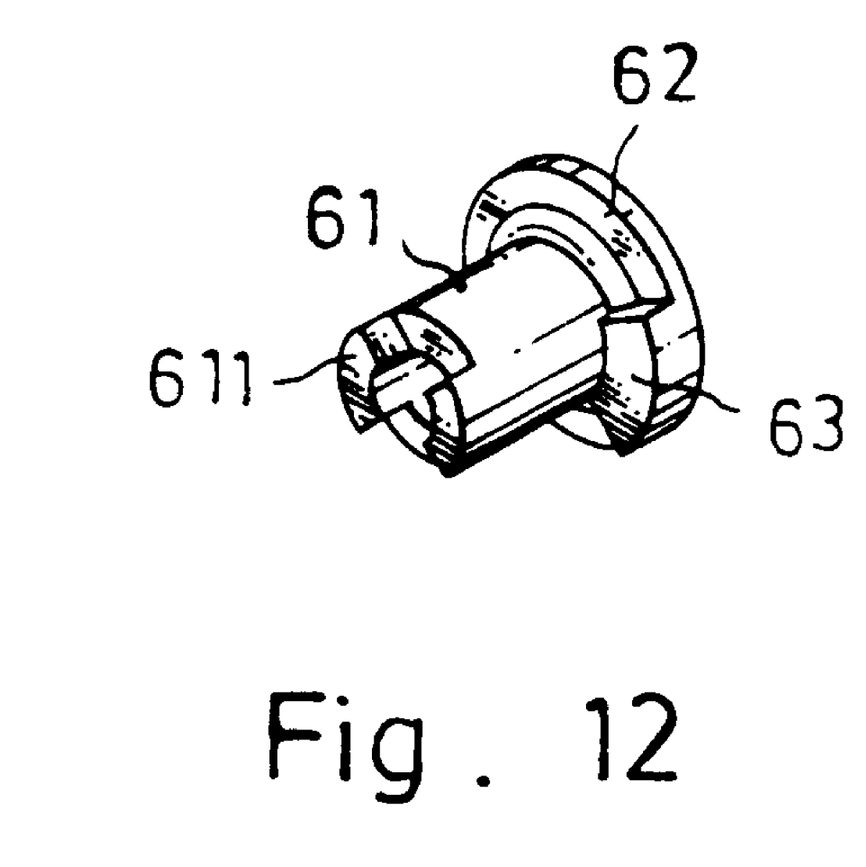
FIG. 12 is a perspective view of an end cap for the bicycle pedal according to the present invention.
Figure 13:
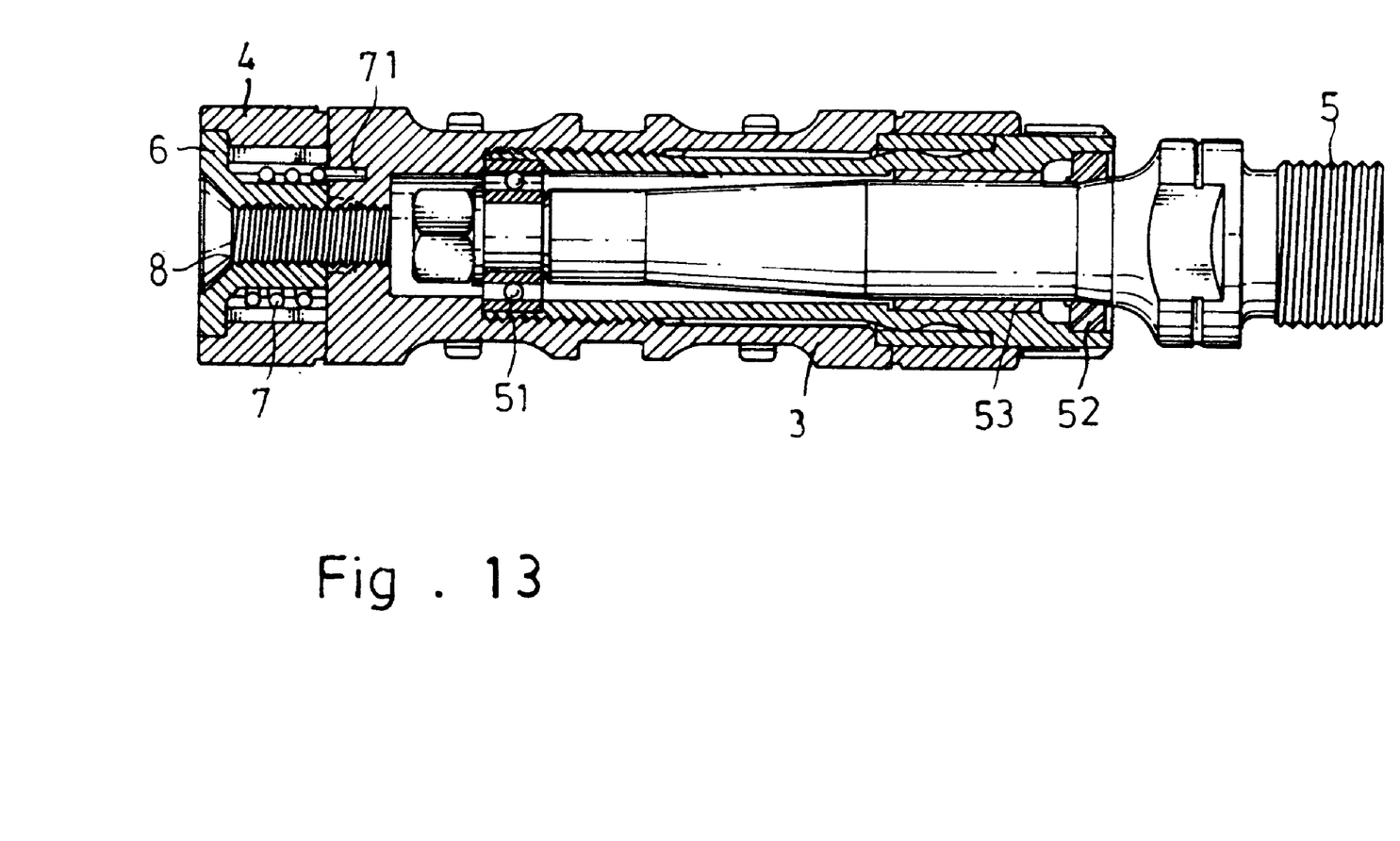
FIG. 13 is a sectional assembly view of the present invention.

The pedal body 3 is a block member comprising an axle hole, which receives the shaft 5, a screw hole 32 axially aligned with the axle hole at one side, two locating grooves 33 at two opposite sides of the screw hole 32, and a locating hole 34 adjacent to the screw hole 32. The cage 4 is made in integrity, and mounted on the shaft 5 around the pedal body 3, having a stepped hole 41 at its one side in alignement with the screw hole 32 at the pedal body 3. The stepped hole 41 defines a sliding groove 411 on the inside, and a notch 412 in the sliding groove 411. The torsional spring 7 is mounted on the end cap 6, having its first end 71 fastened to the locating hole 34 at the pedal body 3 and its second end 72 fastened to the notch 412 in the sliding groove 411 inside the stepped hole 41 in the cage 4. The end cap 6 is shaped like a tee, comprising a flat cap head 62, a countersunk hole 621 at the center of the flat cap head 62, a tubular shank 61 perpendicularly extended from the bottom side of the flat cap head 62 around the countersunk hole 621, a locating block 63 raised from the bottom side of the flat cap head 62 and spaced from the tubular shank 61 at a distance, and two positioning flanges 611 bilaterally axially extended from one end of the tubular shank 61 remote from the annular head 62 which are inserted with the tubular shank 61 through the stepped hole 41 at the cage 4 and respectively engaged into the locating grooves 33 at the pedal body 3. Further, a screw 8 is mounted in the countersunk hole 621 at the end cap 6, and threaded into the screw hole 32 at the pedal body 3 to fix the end cap 6 in place. The shaft 5 has one end mounted with a bearing 51, which supports the pedal body 3, and an opposite end mounted with an oil seal ring 52, which is covered with a cup 53.

During assembly process, the pedal body 3, the cage 4 and the shaft 5 are assembled together, then the torsional spring 7 is mounted on the tubular shank 61 of the end cap 6 and inserted with the tubular shank 61 of the end cap 6 into the stepped hole 41 at the cage 4, and then the screw 8 is mounted in the countersunk hole 621 at the end cap 6 and threaded into the screw hole 32 at the pedal body 3 to fix the end cap 6 in place. When installed, the first end 71 and second end 72 of the torsional spring 7 are respectively fastened to the locating hole 34 at the pedal body 3 and the notch 412 at the sliding groove 411 inside the stepped hole 41 in the cage 4, the positioning flanges 611 of the end cap 6 are respectively engaged into the locating grooves 33 at the pedal body 3, and the locating block 63 of the end cap 6 is inserted into the sliding groove 411 to limit the turning angle of the pedal body 3 relative to the cage 4.

Figure 14:
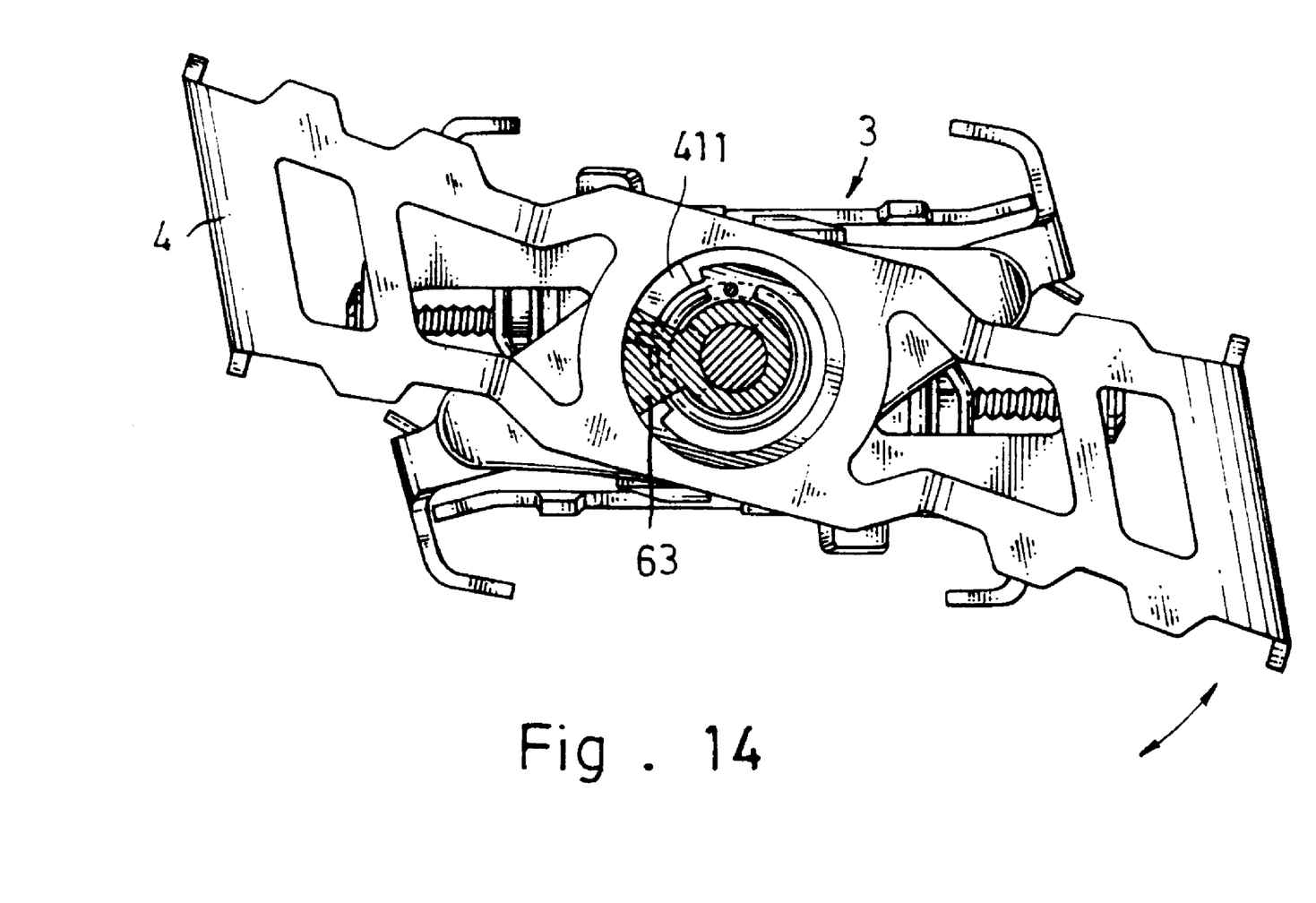
FIG. 14 is an operational view in section of the present invention.
Figure 15:
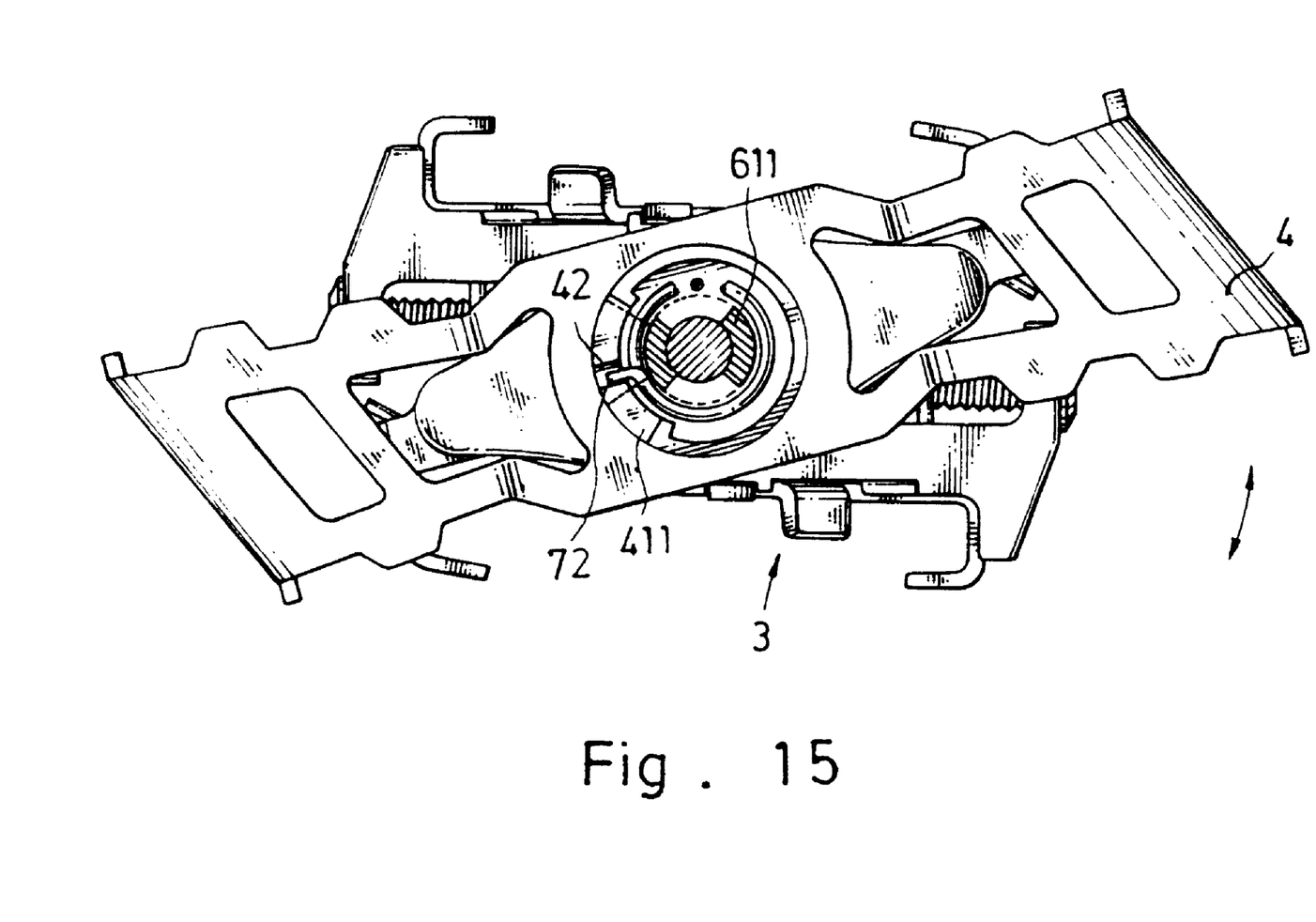
FIG. 15 is another operational view of the present invention.

Referring to FIGS. 14 and 15, the pedal body 3 can be turned through an angle relative to the cage 4. When the torsional force is released from the pedal body 3, the torsional spring 7 immediately turns the pedal body 3 back to its former position. Because the pedal body 3 can be turned forwards and backwards relative to the cage 4 within a limited angle, shocks can be absorbed by the oscillatory motion of the pedal body 3 during pedaling.

What is claimed is:

1. A bicycle pedal comprising a shaft, a cage secured to said shaft, a pedal body mounted on said shaft within said cage and turned about said shaft relative to said cage, and a coupling structure which enables said pedal body to be coupled to said cage and turned about said shaft within a limited angle relative to said cage, wherein said coupling structure comprises a screw hole provided at said pedal body at one side, two locating grooves provided at said pedal body and spaced from said screw hole at two opposite sides, a locating hole provided at said pedal body adjacent to said screw hole, a stepped hole provided at said cage at one side in alignment with the screw hole at said pedal body, a sliding groove provided inside said stepped hole in said cage, a notch provided in said sliding groove inside said cage, an end cap mounted in said stepped hole, said end cap comprising a flat cap head, a countersunk hole at the center of said flat cap head, a tubular shank perpendicularly extended from said cap head around said countersunk hole, and two positioning flanges bilaterally axially extended from one end of said tubular shank remote from said annular head and respectively engaged into said locating grooves inside said pedal body, a torsional spring mounted on the tubular shank of said end cap, said torsional spring having a first end fastened to the locating hole inside said pedal body and a second end fastened to the notch in the stepped hole inside said cage, and a screw mounted in the countersunk hole at said end cap and threaded into the screw hole at said pedal body to fix said end cap to said cage.

2. The bicycle pedal of claim 1 wherein said coupling structure further comprising a locating block raised from the flat cap head of said end cap and inserted into the sliding groove in the stepped hole in said cage to limit the turning angle of said pedal body relative to said cage.

\* \* \* \* \*